(12) United States Patent
Kamata et al.

(10) Patent No.: US 11,467,576 B2
(45) Date of Patent: Oct. 11, 2022

(54) AUTONOMOUS DRIVING SYSTEM

(71) Applicant: TOYOTA JIDOSHA KABUSHIKI KAISHA, Toyota (JP)

(72) Inventors: Nobuhide Kamata, Susono (JP); Ryo Igarashi, Susono (JP); Kazuhiko Kamikado, Susono (JP); Kiyosumi Kidono, Nagakute (JP); Kunihiro Goto, Nagakute (JP); Takashi Naito, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 269 days.

(21) Appl. No.: 16/394,359

(22) Filed: Apr. 25, 2019

(65) Prior Publication Data

US 2019/0346847 A1   Nov. 14, 2019

(30) Foreign Application Priority Data

May 9, 2018   (JP) .............................. JP2018-090524

(51) Int. Cl.
*G05D 1/02* (2020.01)
*G05D 1/00* (2006.01)
(Continued)

(52) U.S. Cl.
CPC ......... *G05D 1/0088* (2013.01); *G05D 1/0246* (2013.01); *G05D 1/0257* (2013.01);
(Continued)

(58) Field of Classification Search
CPC ...... G01S 13/867; G01S 13/89; G01S 13/931; G01S 17/931; G01S 19/13;
(Continued)

(56) References Cited

U.S. PATENT DOCUMENTS 8,509,982 B2   8/2013   Montemerlo et al.
8,521,352 B1   8/2013   Ferguson et al.
(Continued)

FOREIGN PATENT DOCUMENTS

CN   105698801 A   6/2016
JP   2011-27595 A   2/2011
(Continued)

*Primary Examiner* — Behrang Badii
*Assistant Examiner* — Matthew J. Reda
(74) *Attorney, Agent, or Firm* — Sughrue Mion, PLLC

(57) ABSTRACT

An autonomous driving system includes a target object position recognition unit configured to recognize a target object position detected by a vehicle-mounted sensor based on map information in a map database, a vehicle position recognition unit configured to recognize a vehicle position, a relative-relationship-on-map acquisition unit configured to acquire a relative-relationship-on-map between the target object and the vehicle based on the target object position and the vehicle position on the map, a detected-relative-relationship acquisition unit configured to acquire a detected-relative-relationship between the target object detected by the sensor and the vehicle based on a result of detection performed by the sensor, a map accuracy evaluation unit configured to evaluate map accuracy of the map information based on the relative-relationship-on-map and the detected-relative-relationship, and an autonomous driving permission unit configured to permit an autonomous driving control using the map information based on the result of evaluation of the map accuracy.

7 Claims, 2 Drawing Sheets

(51) Int. Cl.
  *G01S 13/86* (2006.01)
  *G01S 19/13* (2010.01)
  *G01S 13/931* (2020.01)

(52) U.S. Cl.
  CPC ........... *G01S 13/867* (2013.01); *G01S 13/931* (2013.01); *G01S 19/13* (2013.01); *G01S 2013/932* (2020.01); *G05D 2201/0213* (2013.01)

(58) Field of Classification Search
  CPC ... G01S 2013/9318; G01S 2013/93185; G01S 2013/9319; G01S 2013/932; G01S 2013/9323; G01C 21/03; B60W 2050/0095; B60W 2520/10; B60W 2520/105; B60W 2554/801; B60W 2554/802; B60W 2556/50; G05D 1/0088; G05D 1/0246; G05D 1/0257; G05D 2201/0213

See application file for complete search history.

(56) References Cited

U.S. PATENT DOCUMENTS

| | | |
|---|---|---|
| 8,527,199 B1 | 9/2013 | Burnette et al. |
| 8,676,430 B1 | 3/2014 | Ferguson et al. |
| 10,836,376 B2 * | 11/2020 | Wodrich ......... B60W 30/18163 |
| 2009/0228204 A1 * | 9/2009 | Zavoli ..................... G01S 19/49 701/532 |
| 2014/0350839 A1 * | 11/2014 | Pack ..................... G05D 1/0214 701/409 |
| 2014/0368493 A1 * | 12/2014 | Rogan .................. G06V 10/462 345/419 |
| 2016/0161265 A1 | 6/2016 | Bagheri |
| 2016/0259814 A1 | 9/2016 | Mizoguchi |
| 2017/0055128 A1 * | 2/2017 | Smith ................ H04W 64/006 |
| 2017/0115377 A1 * | 4/2017 | Giannini .................... G01S 7/35 |
| 2017/0210379 A1 * | 7/2017 | Obata .............. B60W 30/0956 |
| 2019/0018410 A1 * | 1/2019 | Ando ..................... B60W 30/10 |
| 2019/0135275 A1 * | 5/2019 | Park ................... G01C 21/3407 |
| 2022/0055660 A1 * | 2/2022 | Bälter .................. B60W 30/09 |

FOREIGN PATENT DOCUMENTS

| | | |
|---|---|---|
| JP | 2016-161456 A | 9/2016 |
| WO | 2013/138000 A1 | 9/2013 |

* cited by examiner

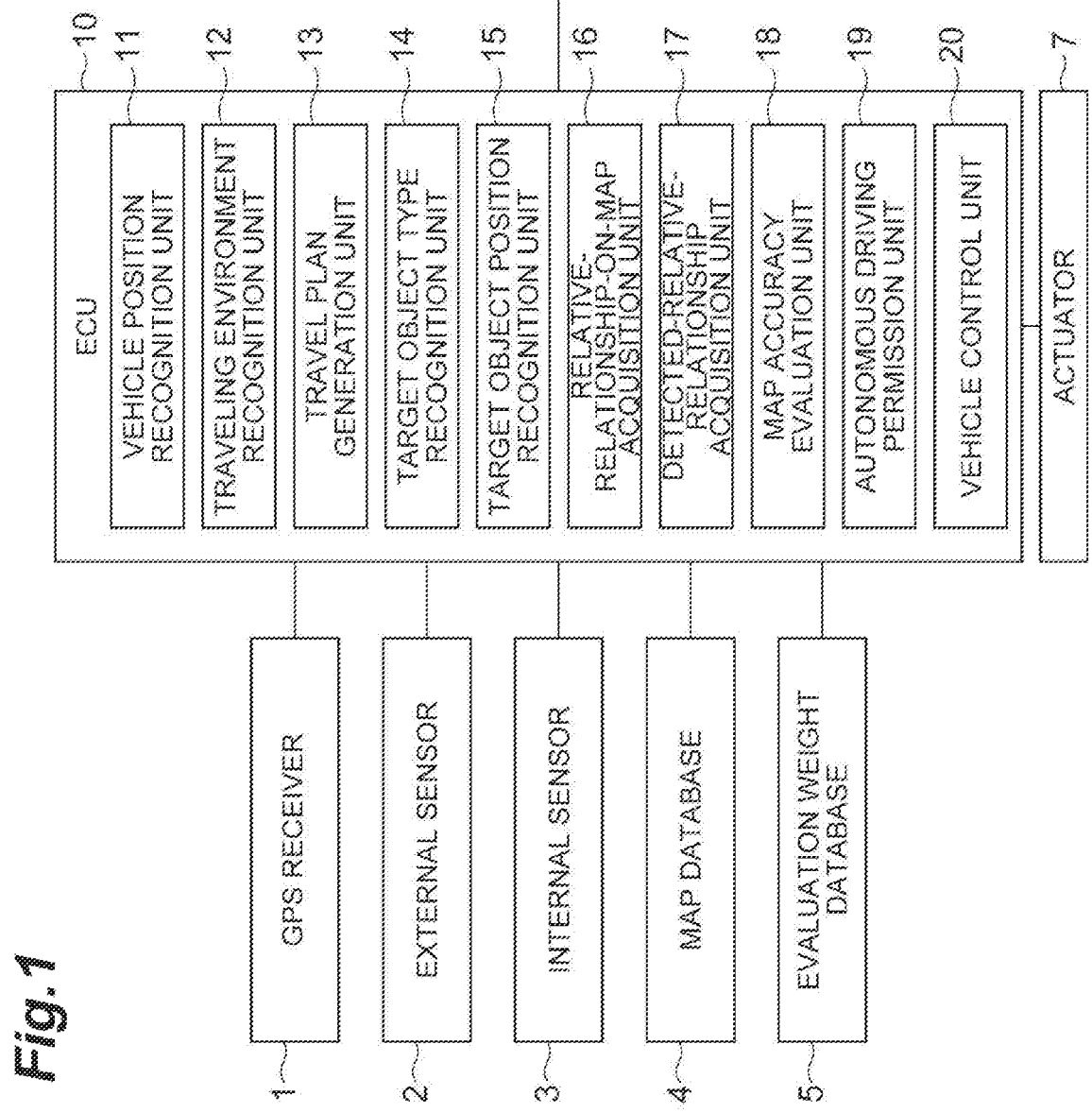

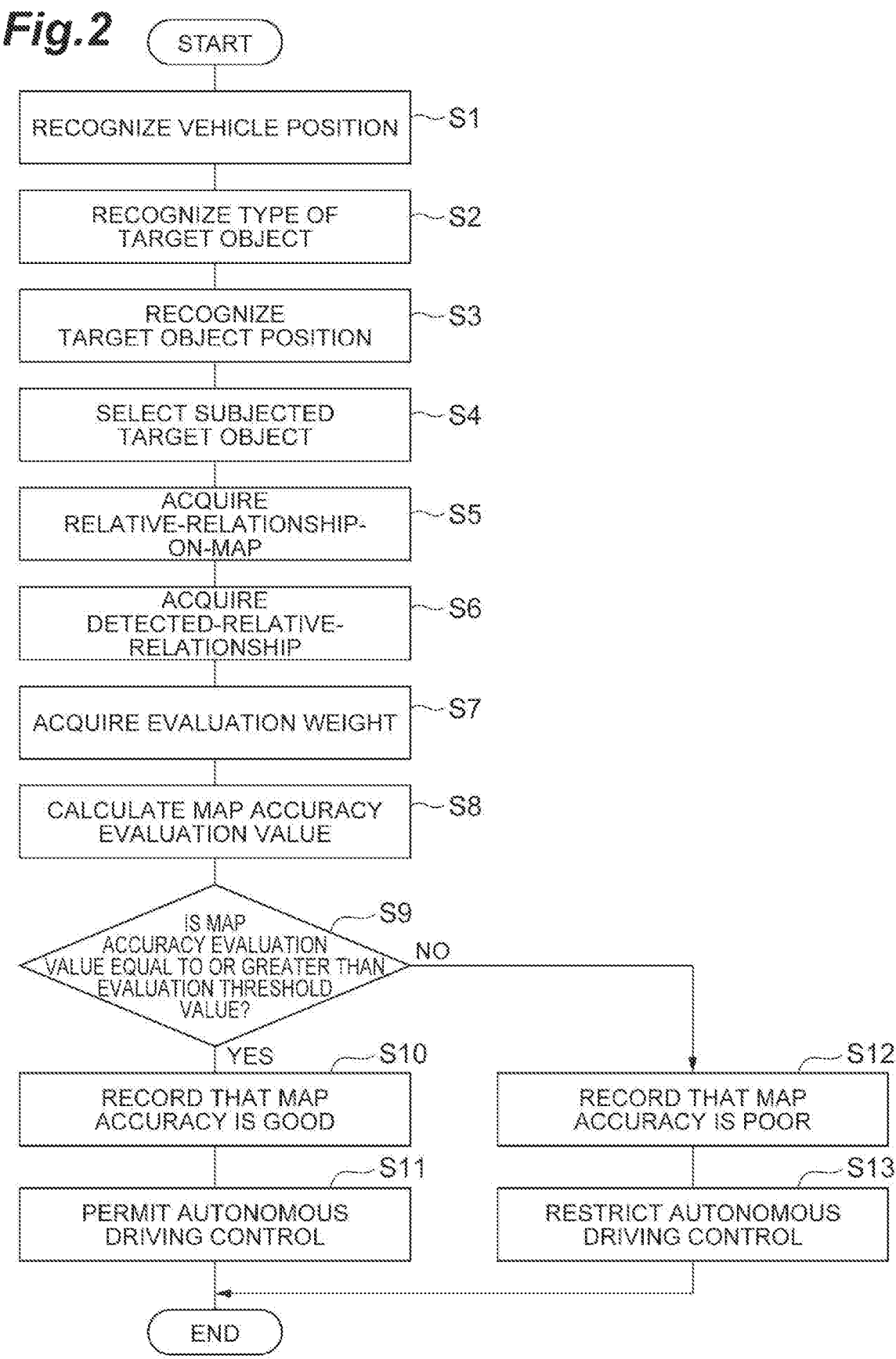

AUTONOMOUS DRIVING SYSTEM

CROSS-REFERENCE TO RELATED APPLICATION

This application claims the benefit of priority from Japanese Patent Application No. 2018-090524, filed May 9, 2018, the entire contents of which are incorporated herein by reference.

TECHNICAL FIELD

The present disclosure relates to an autonomous driving system.

BACKGROUND

In the related art, a technology is known as a technology relating to an autonomous driving system (for example, U.S. Pat. No. 8,509,982), the technology using map information that includes a zone associated with information indicating a driver is required to do a manual driving.

SUMMARY

In an autonomous driving control using the map information, it is desirable that the map information itself is appropriate. In the related art, the attention is focused on the information indicating the driver is required to do the manual driving, but not fully focused on whether the map information itself is appropriate or not.

Therefore, in the present technical field, there is a need for providing an autonomous driving system that appropriately evaluates map accuracy and can appropriately permit the autonomous driving control using the map information.

An autonomous driving system according to an aspect of the present disclosure is configured to include a target object position recognition unit configured to recognize a target object position that is a position of a target object on a map detected by a vehicle-mounted sensor based on map information in a map database, a vehicle position recognition unit configured to recognize a vehicle position that is a position of a vehicle on the map, a relative-relationship-on-map acquisition unit configured to acquire a relative-relationship-on-map that is a relative relationship between the target object detected by the vehicle-mounted sensor and the vehicle based on the target object position and the vehicle position on the map, a detected-relative-relationship acquisition unit configured to acquire a detected-relative-relationship that is a relative relationship between the target object detected by the vehicle-mounted sensor and the vehicle based on a result of detection performed by the vehicle-mounted sensor, a map accuracy evaluation unit configured to evaluate map accuracy of the map information based on a relative-relationship-on-map and the detected-relative-relationship, and an autonomous driving permission unit configured to permit an autonomous driving control using the map information based on the result of evaluation of the map accuracy.

According to the autonomous driving system in an aspect of the present disclosure, the relative-relationship-on-map which is a relative relationship on the map is acquired by the relative-relationship-on-map acquisition unit. The detected-relative-relationship which is a relative relationship based on the result of detection performed by the vehicle-mounted sensor is acquired by the detected-relative-relationship acquisition unit. The map accuracy of the map information is evaluated by the map accuracy evaluation unit by comparing the relative-relationship-on-map with the detected-relative-relationship with the detected-relative-relationship as a reference. The autonomous driving control using the map information is permitted by the autonomous driving permission unit based on the result of map accuracy evaluation. Therefore, according to the autonomous driving system in aspect of the present disclosure, it is possible to appropriately evaluate the map accuracy and appropriately permit the autonomous driving control using map information.

In an embodiment, the autonomous driving system described above may further include a target object type recognition unit configured to recognize a type of the target object. The relative-relationship-on-map acquisition unit may be configured to select a subjected target object of which the type is subject to acquire the relative-relationship-on-map according to the type of the target object, and to acquire the relative-relationship-on-map between the subjected target object and the vehicle if a plurality of target objects are detected by the vehicle-mounted sensor. In this case, the relative-relationship-on-map is acquired by the relative-relationship-on-map acquisition unit using the appropriate type of subjected target object. Therefore, it is possible to evaluate the map accuracy using the appropriate type of subjected target object.

In an embodiment, the autonomous driving system described above may further include a target object type recognition unit configured to recognize a type of the target object, and an evaluation weight database configured to store an evaluation weight corresponding to an influence degree on the map accuracy evaluation in association with the type of the target object. The map accuracy evaluation unit may be configured to acquire the evaluation weight based on the type of the target object and to evaluate the map accuracy based on the evaluation weight. In this case, the map accuracy is evaluated by the map accuracy evaluation unit using the evaluation weight according to the type of the target object. Therefore, it is possible to evaluate the map accuracy while considering the influence of the type of target object on the map accuracy evaluation.

As described above, according to various aspects and embodiments of the present disclosure, it is possible to provide an autonomous driving system that can appropriately evaluate the map accuracy and can appropriately permit the autonomous driving control using the map information.

BRIEF DESCRIPTION OF THE DRAWINGS

FIG. 1 is a block diagram illustrating an autonomous driving system according to an embodiment.

FIG. 2 is a flowchart illustrating an example of map evaluation processing.

DETAILED DESCRIPTION

Hereinafter, embodiments of the present disclosure will be described with reference to the drawings.

An autonomous driving system 100 illustrated in FIG. 1 is mounted on a vehicle (a host vehicle) such as a passenger car, and controls the traveling of the host vehicle. The autonomous driving system 100 switches the driving state of the host vehicle between autonomous driving and manual driving.

The autonomous driving system 100 evaluates the map information accuracy for performing an estimation of the position of the host vehicle on the map (localization) based on a result of measurement performed by a GPS receiver 1 and the result of detection performed by an external sensor 2. The localization is estimating the position of the vehicle on the map (vehicle position estimation) using the position information on a target object on the map.

If an evaluation result shows that the map information accuracy is equal to or higher than a certain accuracy, the autonomous driving system 100 permits the performance of the autonomous driving based on the map information. The autonomous driving here means a driving state that causes the vehicle to autonomously travel along a road on which the vehicle travels. The autonomous driving includes, for example, a driving state in which the host vehicle is caused to autonomously travel toward a destination set in advance without performing the driving operation by the driver. The manual driving means a driving state in which the vehicle is caused to be driven mainly by the driving operation by the driver. The autonomous driving system 100 has a function of performing a driving assistance that mainly assists the driving operation by the driver using the result of detection performed by the external sensor 2 without using the map information. The driving assistance includes an adaptive cruise control (ACC), a lane keeping assist (LKA), and the like.

Configuration of Autonomous Driving System

As illustrated in FIG. 1, the autonomous driving system 100 includes an electronic control unit (ECU) 10 that performs an overall management of the system. The ECU 10 is an electronic control unit including a central processing unit (CPU), read only memory (ROM), random access memory (RAM) and the like. In the ECU 10, for example, various functions are realized by loading a program stored in the ROM into the RAM and executing the program loaded in the RAM by the CPU. The ECU 10 may be configured with a plurality of electronic control units.

The ECU 10 is connected to a GPS receiver 1, an external sensor 2, an internal sensor 3, a map database 4, an evaluation weight database 5, a human machine interface (HMI) 6, and an actuator 7.

The GPS receiver 1 measures a position of the vehicle (for example, latitude and longitude of the vehicle) by receiving signals from equal to or more than three GPS satellites. The GPS receiver 1 transmits information on the measured position of the vehicle to the ECU 10.

In the GPS receiver 1, a failure diagnosis is performed, whether the function of the GPS receiver 1 as hardware is normal or not. For example, the failure diagnosis for the GPS receiver 1 can be performed based on an update cycle of data that can be received by the GPS receiver 1 from the satellite and the number of satellites from which the signal can be received by the GPS receiver 1. The failure diagnosis for the GPS receiver 1 can be performed by various other methods.

The external sensor 2 is a vehicle mounted sensor that detects a situation around the host vehicle. The external sensor 2 includes at least a camera and a radar sensor.

The camera is an imaging device that images the external environment of the vehicle. The camera is provided on the inside of a windshield of the host vehicle or the like. The camera transmits image information relating to the external environment of the host vehicle to the ECU 10. The camera may be a monocular camera or may be a stereo camera. The stereo camera has two imaging units that are arranged so as to reproduce a binocular parallax. The imaging information by the stereo camera includes information on the depth direction and information on the height direction.

The radar sensor is a detection device that detects obstacles around the host vehicle using radio waves (for example, millimeter waves) or light. The radar sensor includes, for example, millimeter wave radar or a light detection and ranging (LIDAR). The radar sensor transmits the radio wave or light to the surroundings of the host vehicle, and detects the obstacles by receiving radio waves or light reflected from obstacles. The radar sensor transmits the detected obstacle information to the ECU 10. The obstacles include fixed obstacles such as trees and buildings, and moving obstacles such as pedestrians, bicycles, other vehicles, and the like.

A sensor detection range of the external sensor 2 is a range in which the camera can image an object, for example, if the external sensor 2 is a camera. The sensor detection range of the external sensor 2 is a range in which the radar sensor can detect an object, for example, if the external sensor 2 is a radar sensor. In addition, if the external sensor 2 is a camera and a radar sensor, the sensor detection range is a combined range in which the camera can image an object and a range in which the radar sensor can detect an object. However, even if the external sensor 2 is a camera and a radar sensor, if only the camera can detect the target object, the sensor detection range of the external sensor 2 may be a range in which the camera can image the object. Even if the external sensor 2 is a camera and a radar sensor, if only the radar sensor can detect the target object, the sensor detection range of the external sensor 2 may be a range in which the radar sensor can image the object.

The internal sensor 3 is a vehicle mounted sensor that detects a travel state of the host vehicle. The internal sensor 3 includes a vehicle speed sensor, an accelerator sensor, and a yaw rate sensor. The vehicle speed sensor is a measurement device that measures a speed of the host vehicle. As the vehicle speed sensor, for example, a vehicle wheel speed sensor is used, which is provided on vehicle wheels of the host vehicle or on a drive shaft rotating integrally with vehicle wheels, and measures a rotational speed of the vehicle wheels. The vehicle speed sensor transmits the measured vehicle speed information (vehicle wheel speed information) to the ECU 10.

The accelerator sensor is a measurement device that measures an acceleration of the host vehicle. The accelerator sensor includes, for example, a longitudinal accelerator sensor that measures acceleration in the longitudinal direction of the host vehicle and a lateral accelerator sensor that measures a lateral acceleration of the host vehicle. The accelerator sensor transmits, for example, acceleration information of the host vehicle to the ECU 10. The yaw rate sensor is a measurement device that measures a yaw rate (rotation angular velocity) around the vertical axis at the center of gravity of the host vehicle. As the yaw rate sensor, for example, a Gyro sensor can be used. The yaw rate sensor transmits the measured yaw rate information of the host vehicle to the ECU 10.

The map database 4 is a database storing the map information. The map database 4 is formed, for example, in a hard disk drive (HDD) mounted on the host vehicle. The map information is detailed map information used for the autonomous driving of the host vehicle. The map information includes information on the shape of the road (for example, curves or the like), information on the position of the intersection, and information on the link of the road. The map database 4 may be stored in a server that can communicate with the vehicle.

The map information includes information on the target object. The target object is an object on which a position on the map (for example, longitude and latitude in the world coordinate system) is determined in advance. The information on the target object includes information on the target object position which is the position of the target object on the map.

The target object includes at least one of a structure provided on a road or around the road and a road marking displayed on a road surface. The structure includes poles, road signs, delineators, road studs (such as chatter bars), curbstones, traffic signals, and the like. Both a tower part and a sign part of the road sign may function as the target object.

The road marking includes mark lines such as lane boundary lines and center lines of the road, marks indicating that there are crosswalks ahead (for example, diamond marks), marks indicating that there is a priority road ahead (for example, triangle marks), progressing direction marks, a pedestrian crossing sign, a pause line, characters of "stop", and the like. The mark lines may include a white line and a yellow line. If the mark lines are indicated as continuous dotted lines or broken lines, each dotted line or broken line may be treated as a target object.

The information relating to the target object may include information on the type of the target object. The type of the target object means a type classified according to the features of the target object. The features of the target object may be, for example, an ease of changing the target object position. The target object position can be changed, for example, by the moving of the target object by itself or the target object being consumed, lost or damaged over the time.

Types of the target objects of which the ease of changing the target object position is low includes, for example, curbstones, poles, road signs, delineators, road studs (chatter bars or the like), traffic signals fixed by struts or the like, trunks of street trees, and buildings. Types of the target objects of which the ease of changing the target object position is high includes, for example, the above-described road markings (mark lines, diamond marks, triangle marks, traveling direction marks, pedestrian crossing signs, pause lines, characters of "stop" or the like), and traffic signals which can be swung while being hung with a string or the like.

The information relating to the target includes the image information on the target object for recognizing the target object from the captured image. The image information on the target object is, for example, information on features of an image used for pattern recognition. The image information on the target object may include the shape of the road signs, the shape of the road marking, and the like. The map database 4 may store the position information on the target object and the image information on the target object in association with each other.

The evaluation weight database 5 is a database that stores an evaluation weight corresponding to an influence degree on the map accuracy evaluation. The evaluation weight is information relating to the degree of influence of the target object on the map accuracy evaluation according to the features of the target object. The evaluation weight database 5 may be formed in a server that can communicate with the host vehicle. The evaluation weight database 5 may be a database integrated with the map database 4.

The evaluation weight is stored in association with the type of the target object. For example, the evaluation weight may be set to a larger numerical value as the influence on the map accuracy evaluation becomes higher. For example, assuming that the evaluation weight in a case of highest influence on the map accuracy evaluation is 1, the evaluation weight may be a coefficient given as a real value included in a section of 0 to 1 depending on the influence on the map accuracy evaluation.

The influence on the map accuracy evaluation may be, for example, the ease of changing the target object position. Specifically, the evaluation weight of the curbstones, the poles, the road signs, the delineators, the road studs (the chatter bars or the like), the traffic signals fixed by the struts, the trunks of street trees and the building may be a coefficient having larger numerical values than the evaluation weight of the above-described road markings (the mark lines, the diamond marks, the triangle marks, the progressing direction marks, the pedestrian crossing signs, the pause lines, the character "stop" or the like, and the traffic signals which can be swung while being hung with a string.

As an example of the evaluation weight, a lateral evaluation weight, a longitudinal evaluation weight, and a height evaluation weight may be stored in the evaluation weight database 5 for each target object. The lateral evaluation weight is the evaluation weight in the width direction of the host vehicle (horizontal direction perpendicular to the traveling direction of the host vehicle). The longitudinal evaluation weight is the evaluation weight in the longitudinal direction of the host vehicle (the depth direction of the captured image). The height evaluation weight is the evaluation weight in the height direction of the host vehicle.

Here, if it can be said that a positional deviation of the target object in a particular direction has a higher influence degree in the map accuracy evaluation than the positional deviation in other directions for the target object detected by the external sensor 2, the evaluation weight in that direction among the lateral evaluation weight, the longitudinal evaluation weight, and the height evaluation weight may be made larger than the evaluation weight in the other direction.

The "positional deviation" is a deviation of the position (relative position deviation) of the target object detected by the external sensor 2 with respect to the position of the vehicle. Specifically, the "deviation of the position" may be the deviation of the position of the target object corresponding to the difference between a relative distance (detected-relative-relationship) between the target object detected by external sensor 2 and the host vehicle, and a relative distance on the map (relative-relationship-on-map) between the target object detected by external sensor 2 and the host vehicle. The "deviation of the position" may include components in the width direction of the host vehicle, the longitudinal direction of the host vehicle, and the height direction of the host vehicle.

"The positional deviation of the target object has a high influence degree in the map accuracy evaluation" means that the probability that the deviation of the position of the target object corresponding to the difference described above is caused by the deviation of the position of the target object on the map is high (that is, the probability that the position of the target object in the map information is deviated is high).

For example, if the target object is a white line (the road marking such as lane boundary lines) extending along the longitudinal direction of the host vehicle, the lateral evaluation weight can be set larger than the longitudinal evaluation weight and the height evaluation weight. If the target object is a white line (road marking such as pause lines) extending along the width direction of the host vehicle, the longitudinal evaluation weight can be set larger than the lateral evaluation weight and the height evaluation weight. If the target object is road studs spaced apart from each other along the longitudinal direction of the host vehicle, the lateral evaluation weight can be set larger than the longitudinal evaluation weight and the height evaluation weight. If the target object is curbstones extending along the longitudinal direction of the host vehicle, the lateral evaluation weight and the height evaluation weight can be set larger than the longitudinal evaluation weight. If the target object is road signs, the longitudinal evaluation weight can be set larger than the lateral evaluation weight and the height evaluation weight.

The HMI 6 is an interface that performs inputting and outputting of the information between the autonomous driving system 100 and the occupant. The HMI 6 includes, for example, a display, a speaker, and the like. The HMI 6 outputs an image on the display and outputs a voice from the speaker according to a control signal from the ECU 10.

The actuator 7 is a device used for controlling the host vehicle. The actuator 7 includes at least a driving actuator, a brake actuator and a steering actuator. The driving actuator controls a driving force of the host vehicle by controlling an amount of air (throttle opening degree) supplied to the engine according to a control signal from the ECU 10. If the host vehicle is a hybrid vehicle, in addition to the amount of air supplied to the engine, the control signal from the ECU 10 is input to a motor as a power source, and then, the driving force is controlled. If the host vehicle is an electric vehicle, the control signal from the ECU 10 is input to a motor as a power source, and then, the driving force of the vehicle V is controlled. The motor as the power source in these cases configures the actuator 7.

The brake actuator controls the brake system according to a control signal from the ECU 10 and controls a braking force applied to the wheels of the host vehicle. For example, a hydraulic brake system can be used as the brake system. The steering actuator controls the driving of an assist motor controlling a steering torque of an electric power steering system according to a control signal from the ECU 10. In this way, the steering actuator controls the steering torque of the host vehicle.

Next, a functional configuration of the ECU 10 will be described. As illustrated in FIG. 1, the ECU 10 includes a vehicle position recognition unit 11, a traveling environment recognition unit 12, a travel plan generation unit 13, a target object type recognition unit 14, a target object position recognition unit 15, a relative-relationship-on-map acquisition unit 16, a detected-relative-relationship acquisition unit 17, a map accuracy evaluation unit 18, an autonomous driving permission unit 19, and a vehicle control unit 20. A part of the functions of the ECU 10 described below may be formed in a server that can communicate with the host vehicle.

The vehicle position recognition unit 11 recognizes the vehicle position which is the position of the host vehicle on the map and the orientation of the host vehicle based on the position information from the GPS receiver 1 and the map information in the map database 4. The vehicle position recognition unit 11 may recognize the vehicle position and the orientation of the host vehicle when the result of failure diagnosis of the GPS receiver 1 indicates that there is no abnormality. For example, in the section on the map where the autonomous driving control could be performed continuously for a predetermined time in the past, the vehicle position recognition unit 11 may correct the recognized vehicle position and the orientation of the host vehicle based on the map information relating to the section.

The traveling environment recognition unit 12 recognizes the traveling environment of the host vehicle based on the result of detection performed by the external sensor 2 and the internal sensor 3. The traveling environment of the host vehicle includes the external environment of the host vehicle and the travel state of the host vehicle. The traveling environment recognition unit 12 recognizes the external environment of the host vehicle including the situation of obstacles around the host vehicle based on result of detection performed by the external sensor 2. The traveling environment recognition unit 12 may perform a recognition of white lines around the host vehicle based on the result of detection performed by the external sensor 2, and then, may recognize the result of recognition of the white line as the external environment. The traveling environment recognition unit 12 recognizes the travel state of the host vehicle such as the vehicle speed, the acceleration, the yaw rate based on the result of detection performed by the internal sensor 3.

The travel plan generation unit 13 generates a travel plan of the host vehicle used for autonomous driving. The travel plan generation unit 13 generates a travel plan of the host vehicle based on, for example, a target route for the autonomous driving set in advance, the map information in the map database 4, the position of the host vehicle on the map recognized by the vehicle position recognition unit 11, and the traveling environment of the host vehicle recognized by the traveling environment recognition unit 12.

The travel plan includes, for example, a control target value of the host vehicle corresponding to the position of the host vehicle on the target route. The position on the target route is a position in the extending direction of the target route on the map. The position on the target route means a set longitudinal position set at a predetermined interval (for example, 1 m) in the extending direction of the target route. The control target value is a value that is a control target of the host vehicle in the travel plan. The control target value is set in association with each set longitudinal position on the target route. The travel plan generation unit 13 sets the set longitudinal position at a predetermined interval on the target route, and sets the control target value (for example, a target lateral position and a target vehicle speed) for each set longitudinal position, and then, generates the travel plan. The set longitudinal position and the target lateral position may be set together as one position coordinate. The set longitudinal position and the target lateral position respectively mean information on the longitudinal position and information on the lateral position set as the targets in the travel plan. The travel plan for the autonomous driving is not limited to the above-described plan, and various plans can be adopted.

The target object type recognition unit 14 recognizes the target object included in the captured image and recognizes the types of the target object based on, for example, the image captured by the external sensor 2, the image information on the target object stored in the map database 4, and the vehicle position and the orientation of the host vehicle recognized by the vehicle position recognition unit 11. If a plurality of target objects are detected by the external sensor 2, the target object type recognition unit 14 may recognize each of the plurality of target objects and recognize the types of the target object for each of the plurality of target objects.

The target object position recognition unit 15 recognizes the target object position based on the result of detection performed by the external sensor 2, the vehicle position, and the map information. The target object position is a position on the map of the target object detected by the external sensor 2. The target object position recognition unit 15 recognizes the target object position based on the recognized target object and the map information (position information on the map associated with the recognized target object).

The target object position recognition unit 15 may recognize the target object position based on, for example, the image captured by the external sensor 2, the position information on the target object stored in the map database 4, and the vehicle position and the orientation of the host vehicle recognized by the vehicle position recognition unit 11. If a plurality of target objects are detected by the external sensor 2, the target object position recognition unit 15 may recognize the target object position for each of the plurality of target objects.

The relative-relationship-on-map acquisition unit 16 acquires a relative-relationship-on-map based on the target object position and the vehicle position. The relative-relationship-on-map is, for example, a relative positional relationship (for example, a relative distance) on the map between the target object detected by the external sensor 2 and the host vehicle. The relative-relationship-on-map means a relative positional relationship between the target object and the host vehicle in a virtual space or a plane on the map. As an example of the relative-relationship-on-map, the relative-relationship-on-map acquisition unit 16 calculates a relative distance on the map between the target object and the host vehicle. The relative distance on the map between the target object and the host vehicle may include a lateral relative distance on the map, a longitudinal relative distance on the map, and a height relative distance on the map between the subjected target object and the host vehicle.

If a plurality of target objects are detected by the external sensor 2, the relative-relationship-on-map acquisition unit 16 selects the subjected target object according to the type of the target object recognized by the target object type recognition unit 14. The subjected target object is the target object of which the type is subject to acquire the relative-relationship-on-map.

For example, if a plurality of target objects include a target object having a high ease of changing the target object position and a target object having a low ease of changing the target object position, the relative-relationship-on-map acquisition unit 16 selects the subjected target object according to the type of the target object having the low ease of changing the target object position. For example, if the type of the recognized target object is the curbstones and the mark lines, the relative-relationship-on-map acquisition unit 16 may select the curbstones as the subjected target object. For example, if the type of the recognized target object is the curbstones arranged along the road and the road studs provided apart from each other, the relative-relationship-on-map acquisition unit 16 may select the curbstones as the subjected target object.

The relative-relationship-on-map acquisition unit 16 acquires the relative-relationship-on-map between the subjected target object and the host vehicle. The relative-relationship-on-map acquisition unit 16 acquires the relative distance on the map between the subjected target object and the host vehicle as the relative-relationship-on-map based on the target object position of the subjected target object and the vehicle position.

The relative-relationship-on-map includes, for example, the lateral relative distance on the map, the longitudinal relative distance on the map, and the height relative distance on the map. The lateral relative distance on the map is a component of the relative distance on the map between the subjected target object and the host vehicle in the width direction of the host vehicle. The longitudinal relative distance on the map is a component of the relative distance on the map between the subjected target object and the host vehicle in the longitudinal direction of the host vehicle. The height relative distance on the map is a component of the relative distance on the map between the subjected target object and the host vehicle in the height direction of the host vehicle.

The detected-relative-relationship acquisition unit 17 acquires a detected-relative-relationship based on the result of detection performed by the external sensor 2. The detected-relative-relationship is, for example, the relative positional relationship (for example, the relative distance) between the target object detected by the external sensor 2 and the host vehicle. The detected-relative-relationship means the relative positional relationship between the target object and the host vehicle in a real space or on a real plane. As an example, the detected-relative-relationship acquisition unit 17 acquires a detected lateral relative distance, a detected longitudinal relative distance, and a detected height relative distance between the subjected target object and the host vehicle, as the detected-relative-relationship based on the result of detection performed by the external sensor 2 and a sensor parameter of the external sensor 2. The sensor parameter of the external sensor 2 may include a relative attachment position of the external sensor 2 relative to the attachment position of the GPS receiver 1 in the host vehicle.

The map accuracy evaluation unit 18 evaluates the map accuracy of the map information based on the relative-relationship-on-map and the detected-relative-relationship. The map accuracy evaluation unit 18 acquires an evaluation weight according to the type of the subjected target object, based on the type of the subjected target object and the evaluation weight stored in the evaluation weight database 5. The map accuracy evaluation unit 18 acquires the lateral evaluation weight, the longitudinal evaluation weight, and the height evaluation weight of the subjected target object as an evaluation weight.

With regard to the map subject to the map accuracy evaluation, the map accuracy evaluation unit 18 may evaluate the map accuracy of the map information on a section of a predetermined distance along the road where the host vehicle is positioned. The map accuracy evaluation unit 18 may evaluate the map accuracy of the map information on the interval defined by a node or a link including the vehicle position. The map accuracy evaluation unit 18 may evaluate the map accuracy of the map information in a sensor detection range of the external sensor 2 with the vehicle position as a center. The map accuracy evaluation unit 18 may evaluate the map accuracy for a certain range of the map information set in advance.

The map accuracy evaluation unit 18 evaluates the map accuracy based on the relative-relationship-on-map, the detected-relative-relationship, and the evaluation weight. As an example of the map accuracy evaluation, the map accuracy evaluation unit 18 calculates a map accuracy evaluation value and compares the calculated map accuracy evaluation value with an evaluation threshold value. The map accuracy evaluation value is an index for evaluating the accuracy of the map. The map accuracy evaluation value can be calculated, for example, by multiplying the difference between the relative-relationship-on-map and the detected-relative-relationship by the evaluation weight.

The map accuracy evaluation value may include a lateral evaluation value, a longitudinal evaluation value, and a height evaluation value. The lateral evaluation value is the evaluation value in the width direction of the host vehicle.

The lateral evaluation value can be calculated by multiplying the difference between the lateral relative distance on the map and the detected lateral relative distance by the lateral evaluation weight. The longitudinal evaluation value is the evaluation value in the longitudinal direction of the host vehicle. The longitudinal evaluation value can be calculated by multiplying the difference between the longitudinal relative distance on the map and the detected longitudinal relative distance by the longitudinal evaluation weight. The height evaluation value is the evaluation value in the height direction of the host vehicle. The height evaluation value can be calculated by multiplying the difference between the height relative distance on the map and the detected height relative distance by the height evaluation weight.

The map accuracy evaluation unit 18 determines whether or not the map accuracy evaluation value is equal to or greater than the evaluation threshold value. The evaluation threshold value is a threshold value of the map accuracy evaluation value for determining whether or not the accuracy of the map is high enough to permit the autonomous driving control. The evaluation threshold value may be set in advance according to the localization accuracy required in the autonomous driving control. The evaluation threshold value may be provided separately for each of the lateral evaluation value, the longitudinal evaluation value, and the height evaluation value, or may be a common threshold value.

If it is determined that the map accuracy evaluation value is equal to or greater than the evaluation threshold value, the map accuracy evaluation unit 18 records the information indicating that the accuracy of the map is high enough to permit the autonomous driving control (hereinafter, referred to as "accuracy of the map is good"), in the map database 4. If it is determined that the map accuracy evaluation value is not equal to or greater than the evaluation threshold value, the map accuracy evaluation unit 18 records the information indicating that the accuracy of the map does not reach a degree that permits the autonomous driving control (hereinafter, referred to as "accuracy of the map is poor") in the map database 4. The map accuracy evaluation unit 18 may record the information indicating that the accuracy of the map is good or poor, for example, by switching the value (0 or 1) of the map quality defect flag, in the map database 4.

The autonomous driving permission unit 19 permits the autonomous driving control using the map information based on the result of evaluation of the map accuracy. If it is determined by the map accuracy evaluation unit 18 that the map accuracy evaluation value is equal to or greater than the evaluation threshold value, the autonomous driving permission unit 19 permits the vehicle control unit 20 to perform the autonomous driving control using the map information. The autonomous driving permission unit 19 may substantially permit the performing of the autonomous driving control by changing a state of the autonomous driving system 100 to a ready state.

If it is determined by the map accuracy evaluation unit 18 that the map accuracy evaluation value is not equal to or greater than the evaluation threshold value, the autonomous driving permission unit 19 restricts the vehicle control unit 20 from performing the autonomous driving control using the map information. For example, the autonomous driving permission unit 19 prohibits the vehicle control unit 20 from performing the autonomous driving control using the map information. The autonomous driving permission unit 19 may substantially prohibit the performing of the autonomous driving control by maintaining the state of the autonomous driving system 100 in a stand-by state without changing the state to the ready state. The autonomous driving permission unit 19 may permit the vehicle control unit 20 to perform the autonomous driving control using the map information if it is determined by the map accuracy evaluation unit 18 that the map accuracy evaluation value becomes equal to or greater than the evaluation threshold value as a result of the movement of the host vehicle, for example. Alternatively, the autonomous driving permission unit 19 may prohibit the vehicle control unit 20 from performing the autonomous driving control using the map information, and may permit the vehicle control unit 20 to perform the driving assistance control using the result of detection by the external sensor 2 without using the map information. The content of the driving assistance is not particularly limited, and various well-known control can be adopted.

The vehicle control unit 20 performs the autonomous driving based on the travel plan generated by the travel plan generation unit 13 if the autonomous driving control using the map information is permitted by autonomous driving permission unit 19. The vehicle control unit 20 performs the autonomous driving by transmitting a control signal to the actuator 7 of the host vehicle.

Map Evaluation Processing by Autonomous Driving System

Next, the map evaluation processing by the autonomous driving system 100 according to the present embodiment will be described with reference to FIG. 2. FIG. 2 is a flowchart illustrating an example of the map evaluation processing. The processing in the flowchart illustrated in FIG. 2 is performed when, for example, the result of failure diagnosis of the GPS receiver 1 indicates that there is no abnormality and when the autonomous driving is about to be started (for example, when the operation to the HMI 6 for starting the autonomous driving is performed by the driver). If the result of failure diagnosis of the GPS receiver 1 indicates that there is abnormality, the autonomous driving may be prohibited to start.

As illustrated in FIG. 2, as S1, the ECU 10 of the autonomous driving system 100 recognizes the vehicle position using the vehicle position recognition unit 11. The vehicle position recognition unit 11 recognizes the vehicle position and the orientation of the host vehicle which is the position of the host vehicle on the map based on the position information from the GPS receiver 1 and the map information in the map database 4.

In S2, the ECU 10 recognizes the type of the target object using the target object type recognition unit 14. The target object type recognition unit 14 recognizes the target object included in the captured image and recognizes the type of the target object based on, for example, the image captured by the external sensor 2, the image information on the target object stored in the map database 4, and the vehicle position and the orientation of the host vehicle recognized by the vehicle position recognition unit 11.

If a plurality of target objects are detected by the external sensor 2, the target object type recognition unit 14 recognizes the type of the target object for each of the plurality of target objects.

In S3, the ECU 10 recognizes the target object position using the target object position recognition unit 15. The target object position recognition unit 15 recognizes the target object position based on the result of detection performed by the external sensor 2, the vehicle position, and the map information. If a plurality of target objects are detected by the external sensor 2, the target object position recognition unit 15 recognizes the target object position for each of the plurality of target objects.

In S4, the ECU 10 selects the subjected target object using the relative-relationship-on-map acquisition unit 16. If a plurality of target objects are detected by the external sensor 2, the relative-relationship-on-map acquisition unit 16 selects the subjected target object according to the type of the target object recognized by the target object type recognition unit 14.

In S5, the ECU 10 acquires the relative-relationship-on-map using the relative-relationship-on-map acquisition unit 16. As an example of the relative-relationship-on-map between the subjected target object and the host vehicle, the relative-relationship-on-map acquisition unit 16 acquires the lateral relative distance on the map, the longitudinal relative distance on the map, and the height relative distance on the map based on the target object position of the subjected target object and the vehicle position.

In S6, the ECU 10 acquires the detected-relative-relationship using the detected-relative-relationship acquisition unit 17. As an example of the detected-relative-relationship between the subjected target object and the host vehicle, the detected-relative-relationship acquisition unit 17 acquires the detected lateral relative distance, the detected longitudinal relative distance, and the detected height relative distance based on the result of detection performed by the external sensor 2 and the sensor parameter of the external sensor 2.

In S7, the ECU 10 acquires the evaluation weight using the map accuracy evaluation unit 18. As an example of the evaluation weight, the map accuracy evaluation unit 18 acquires the lateral evaluation weight, the longitudinal evaluation weight, and the height evaluation weight based on the type of the subjected target object and the evaluation weight information.

In S8, the ECU 10 calculates the map accuracy evaluation value using the map accuracy evaluation unit 18. As an example of the map accuracy evaluation value, the map accuracy evaluation unit 18 calculates the lateral evaluation value, the longitudinal evaluation value, and the height evaluation value based on the relative-relationship-on-map, the detected-relative-relationship, and the evaluation weight.

In S9, the ECU 10 determines whether or not the map accuracy evaluation value is equal to or greater than the evaluation threshold value using the map accuracy evaluation unit 18. For example, the map accuracy evaluation unit 18 performs the above-described determination for each of the lateral evaluation value, the longitudinal evaluation value, and the height evaluation value.

If it is determined that the map accuracy evaluation value is equal to or greater than the evaluation threshold value (YES in S9), the ECU 10 makes the process proceed to S10. In S10, the ECU 10 records that the map accuracy is good using the map accuracy evaluation unit 18. For example, the map accuracy evaluation unit 18 records the information indicating that the map accuracy is good in the map database 4 by setting the value of the map quality defect flag to 0.

In S11, the ECU 10 permits the autonomous driving control using the autonomous driving permission unit 19. As an example, the autonomous driving permission unit 19 changes the state of the autonomous driving system 100 to the ready state and permits the vehicle control unit 20 to perform the autonomous driving control using the map information. Thereafter, the ECU 10 ends the map evaluation processing in FIG. 2.

On the other hand, if it is determined that the map accuracy evaluation value is not equal to or greater than the evaluation threshold value (NO in S9), the ECU 10 makes the process proceed to S12. In S12, the ECU 10 records that the map accuracy is poor using the map accuracy evaluation unit 18. For example, the map accuracy evaluation unit 18 records the information indicating that the map accuracy is poor in the map database 4 by setting the value of the map quality defect flag to 1.

In S13, the ECU 10 restricts the autonomous driving control using the autonomous driving permission unit 19. As an example, the autonomous driving permission unit 19 maintains the state of the autonomous driving system 100 in the stand-by state and prohibits the vehicle control unit 20 from performing the autonomous driving control using the map information. Thereafter, the ECU 10 ends the map evaluation processing in FIG. 2. Alternatively, instead of ending the map evaluation processing, the ECU 10 may repeatedly continue the map evaluation processing in FIG. 2 until the host vehicle arrives at a place where it is determined that the map accuracy evaluation value is equal to or greater than the evaluation threshold value (YES in S9). In this case, for example, the host vehicle may be moved by the manual driving by the driver.

Working of Autonomous Driving System

According to the autonomous driving system 100 in the present embodiment described above, the relative-relationship-on-map which is a relative relationship on the map is acquired by the relative-relationship-on-map acquisition unit 16. The detected-relative-relationship which is a relative relation based on the result of detection performed by the external sensor 2 is acquired by the detected-relative-relationship acquisition unit 17. The map accuracy of the map information is evaluated by the map accuracy evaluation unit 18 by comparing the relative-relationship-on-map with the detected-relative-relationship with the detected-relative-relationship as a reference. The autonomous driving control using the map information is permitted by the autonomous driving permission unit 19 based on the result of map accuracy evaluation. Therefore, according to the autonomous driving system 100, it is possible to appropriately evaluate the map accuracy and appropriately permit the autonomous driving control using map information.

The autonomous driving system 100 includes a target object type recognition unit 14 that recognizes the type of the target object. The relative-relationship-on-map acquisition unit 16 selects a subjected target object of which the type is subject to acquire the relative-relationship-on-map, according to the type of the target object. The relative-relationship-on-map acquisition unit 16 acquires the relative-relationship-on-map between the subjected target object and the host vehicle, if a plurality of target objects are detected by the external sensor 2. In this way, the relative-relationship-on-map acquisition unit 16 acquires the relative-relationship-on-map using the subjected target object having the appropriate type. Therefore, it is possible to evaluate the map accuracy using the appropriate type of subjected target object.

The autonomous driving system 100 includes the target object type recognition unit 14 that recognizes the type of the target object and the evaluation weight database 5 that stores the evaluation weight corresponding to the influence degree on the map accuracy evaluation in association with the type of the target object. The map accuracy evaluation unit 18 acquires the evaluation weight based on the type of the target object. The map accuracy evaluation unit 18 evaluates the map accuracy based on the acquired evaluation weight. In this way, the map accuracy is evaluated by the map accuracy evaluation unit 18 using the evaluation weight corresponding to the type of the target object. Therefore, it is possible to evaluate the map accuracy while considering the influence of the type of target object on the map accuracy evaluation.

Modification Example

The present disclosure is not limited to the embodiment described above. The present disclosure can be implemented in various forms including various modifications and improvements based on the knowledge of those skilled in the art, including the embodiment described above.

In the autonomous driving system 100, the functional configuration for performing the map evaluation processing is integrated with the ECU 10, but the present disclosure is not limited thereto. For example, the traveling environment recognition unit 12, the travel plan generation unit 13, and the vehicle control unit 20 which are functional configurations for performing the autonomous driving control, may be provided in another ECU or a server that can communicate with the ECU 10.

The autonomous driving system 100 does not necessarily need to include the evaluation weight database 5. In this case, for example, the map accuracy evaluation unit 18 can evaluate the map accuracy by comparing the map accuracy evaluation value calculated as the difference between the relative-relationship-on-map and the detected-relative-relationship with the evaluation threshold value. In addition, the processing in S7 in FIG. 2 is omitted.

The relative-relationship-on-map acquisition unit 16 does not necessarily need to select the subjected target object according to the type of the target object. In this case, for example, the relative-relationship-on-map acquisition unit 16 can treat all of the target objects recognized by the target object type recognition unit 14 as the subjected target object. In addition, the processing in S4 in FIG. 2 is omitted.

The map accuracy evaluation unit 18 evaluates the map accuracy based on the difference between the relative-relationship-on-map and the detected-relative-relationship, however, the present disclosure is not limited to this example. The map accuracy evaluation unit 18 may calculate the map accuracy evaluation value based on the number of target objects included in the sensor detection range of the external sensor 2 of the host vehicle among the target objects. For example, the map accuracy evaluation unit 18 may evaluate the map accuracy based on the number of target objects detected by the external sensor 2 and the number of target objects on the map corresponding to the target object detected by the external sensor 2. In this case, "the number of target objects on the map corresponding to the target object detected by the external sensor 2" can be the number of target objects included in the sensor detection range of the external sensor 2, with the position of the host vehicle on the map as a reference.

The autonomous driving permission unit 19 may permit or restrict the autonomous driving control using the map information based on the result of map accuracy evaluation evaluated in the past. In this case, for example, the autonomous driving permission unit 19 may permit or restrict the autonomous driving control using map information based on the value of the map quality defect flag recorded in map database 4.

What is claimed is:

1. An autonomous driving system comprising a controller configured to:
recognize a target object position that is a position of a target object on a map detected by a vehicle-mounted sensor based on map information in a map database;
recognize a vehicle position that is a position of a vehicle on the map;
acquire a relative-relationship-on-map that is a relative distance between the target object detected by the vehicle-mounted sensor and the vehicle based on the target object position and the vehicle position on the map, the target object position being acquired from position information on the map associated with the target object detected by the vehicle-mounted sensor;
acquire a detected-relative-relationship that is a relative distance between the target object detected by the vehicle-mounted sensor and the vehicle, the relative distance being acquired from the result of detection performed by the vehicle-mounted sensor and a sensor parameter of the vehicle-mounted sensor including an attachment position of the vehicle mounted sensor;
acquire a map accuracy evaluation value that is calculated based on a difference between the relative distance of the relative-relationship-on-map and the relative distance of the detected-relative-relationship;
compare the map accuracy evaluation value to an evaluation threshold; and
permit an autonomous driving control using the map information based on a result of evaluation of the map accuracy, wherein the controller is further configured to:
recognize a type of the target object, the type of the target object being a type classified according to a feature of the target object including an ease of changing the target object position;
the autonomous driving system further comprising an evaluation weight database configured to store an evaluation weight corresponding to the ease of changing the target object position in association with the type of the target object, and the evaluation weight associated with the type of target object having the low ease of changing the target object position is larger than the evaluation weight associated with the type of target object having the high ease of changing the target object position,
wherein the controller is further configured to acquire the evaluation weight from the evaluation weight database based on the type of the target object and to evaluate the map accuracy based on the evaluation weight.

2. An autonomous driving system comprising a controller configured to:
recognize a target object position that is a position of a target object on a map detected by a vehicle-mounted sensor based on map information in a map database;
recognize a vehicle position that is a position of a vehicle on the map;
acquire a relative-relationship-on-map that is a relative distance between the target object detected by the vehicle-mounted sensor and the vehicle based on the target object position and the vehicle position on the map, the target object position being acquired from position information on the map associated with the target object detected by the vehicle-mounted sensor;
acquire a detected-relative-relationship that is a relative distance between the target object detected by the vehicle-mounted sensor and the vehicle, the relative distance being acquired from the result of detection performed by the vehicle-mounted sensor and a sensor parameter of the vehicle-mounted sensor including an attachment position of the vehicle mounted sensor;
acquire a map accuracy evaluation value that is calculated based on a difference between the relative distance of the relative-relationship-on-map and the relative distance of the detected-relative-relationship;
compare the map accuracy evaluation value to an evaluation threshold; and
permit an autonomous driving control using the map information based on a result of evaluation of the map accuracy,
wherein the controller is further configured to:
recognize a type of the target object, the type of the target object being a type classified according to a feature of the target object including an ease of changing the target object position,
select a target object having a low ease of changing the target object position as a subjected target object if a plurality of target objects detected by the vehicle-mounted sensor include a target object having a high ease of changing the target object position and the target object having the low ease of changing the target object position,
the autonomous driving system, further comprising an evaluation weight database configured to store an evaluation weight corresponding to the ease of changing the target object position in association with the type of the target object, and the evaluation weight associated with the type of target object having the low ease of changing the target object position is larger than the evaluation weight associated with the type of target object having the high ease of changing the target object position,
wherein the controller is further configured to acquire the evaluation weight from the evaluation weight database based on the type of the target object and to evaluate the map accuracy based on the evaluation weight.

3. An autonomous driving system comprising a controller configured to:
recognize a target object position that is a position of a target object on a map detected by a vehicle-mounted sensor based on map information in a map database;
recognize a vehicle position that is a position of a vehicle on the map;
acquire a relative-relationship-on-map that is a relative distance between the target object detected by the vehicle-mounted sensor and the vehicle based on the target object position and the vehicle position on the map, the target object position being acquired from position information on the map associated with the target object detected by the vehicle-mounted sensor;
acquire a detected-relative-relationship that is a relative distance between the target object detected by the vehicle-mounted sensor and the vehicle, the relative distance being acquired from the result of detection performed by the vehicle-mounted sensor and a sensor parameter of the vehicle-mounted sensor including an attachment position of the vehicle mounted sensor;
acquire a map accuracy evaluation value that is calculated based on a difference between the relative distance of the relative-relationship-on-map and the relative distance of the detected-relative-relationship;
compare the map accuracy evaluation value to an evaluation threshold; and
permit an autonomous driving control using the map information based on a result of evaluation of the map accuracy, wherein the map accuracy evaluation value includes a lateral evaluation value, a longitudinal evaluation value, and a height evaluation value, and wherein the controller is further configured to:
compare the lateral evaluation value to a lateral evaluation threshold;
compare the longitudinal evaluation value to a longitudinal evaluation threshold;
compare the height evaluation value to a height evaluation threshold; and
based on the target object being a white line extending along a longitudinal direction of the vehicle, set a lateral evaluation weight to be higher than a longitudinal evaluation weight and a height evaluation weight.

4. An autonomous driving system comprising a controller configured to:
recognize a target object position that is a position of a target object on a map detected by a vehicle-mounted sensor based on map information in a map database;
recognize a vehicle position that is a position of a vehicle on the map;
acquire a relative-relationship-on-map that is a relative distance between the target object detected by the vehicle-mounted sensor and the vehicle based on the target object position and the vehicle position on the map, the target object position being acquired from position information on the map associated with the target object detected by the vehicle-mounted sensor;
acquire a detected-relative-relationship that is a relative distance between the target object detected by the vehicle-mounted sensor and the vehicle, the relative distance being acquired from the result of detection performed by the vehicle-mounted sensor and a sensor parameter of the vehicle-mounted sensor including an attachment position of the vehicle mounted sensor;
acquire a map accuracy evaluation value that is calculated based on a difference between the relative distance of the relative-relationship-on-map and the relative distance of the detected-relative-relationship;
compare the map accuracy evaluation value to an evaluation threshold; and
permit an autonomous driving control using the map information based on a result of evaluation of the map accuracy, wherein the controller is further configured to, based on the target object being a white line extending along a width direction of the host vehicle, set a longitudinal evaluation weight to be larger than a lateral evaluation weight and a height evaluation weight.

5. An autonomous driving system comprising a controller configured to:
recognize a target object position that is a position of a target object on a map detected by a vehicle-mounted sensor based on map information in a map database;
recognize a vehicle position that is a position of a vehicle on the map;
acquire a relative-relationship-on-map that is a relative distance between the target object detected by the vehicle-mounted sensor and the vehicle based on the target object position and the vehicle position on the map, the target object position being acquired from position information on the map associated with the target object detected by the vehicle-mounted sensor;
acquire a detected-relative-relationship that is a relative distance between the target object detected by the vehicle-mounted sensor and the vehicle, the relative distance being acquired from the result of detection performed by the vehicle-mounted sensor and a sensor parameter of the vehicle-mounted sensor including an attachment position of the vehicle mounted sensor;

acquire a map accuracy evaluation value that is calculated based on a difference between the relative distance of the relative-relationship-on-map and the relative distance of the detected-relative-relationship;

compare the map accuracy evaluation value to an evaluation threshold; and permit an autonomous driving control using the map information based on a result of evaluation of the map accuracy, wherein the controller is further configured to, based on the target object being road studs spaced apart from each other along a longitudinal direction of the host vehicle, set a lateral evaluation weight to be larger than a longitudinal evaluation weight and a height evaluation weight.

6. An autonomous driving system comprising a controller configured to:

recognize a target object position that is a position of a target object on a map detected by a vehicle-mounted sensor based on map information in a map database;

recognize a vehicle position that is a position of a vehicle on the map;

acquire a relative-relationship-on-map that is a relative distance between the target object detected by the vehicle-mounted sensor and the vehicle based on the target object position and the vehicle position on the map, the target object position being acquired from position information on the map associated with the target object detected by the vehicle-mounted sensor;

acquire a detected-relative-relationship that is a relative distance between the target object detected by the vehicle-mounted sensor and the vehicle, the relative distance being acquired from the result of detection performed by the vehicle-mounted sensor and a sensor parameter of the vehicle-mounted sensor including an attachment position of the vehicle mounted sensor;

acquire a map accuracy evaluation value that is calculated based on a difference between the relative distance of the relative-relationship-on-map and the relative distance of the detected-relative-relationship;

compare the map accuracy evaluation value to an evaluation threshold; and permit an autonomous driving control using the map information based on a result of evaluation of the map accuracy, wherein the controller is further configured to, based on the target object being curbstones extending along a longitudinal direction of the host vehicle, set a lateral evaluation weight and a height evaluation weight to be larger than a longitudinal evaluation weight.

7. An autonomous driving system comprising a controller configured to:

recognize a target object position that is a position of a target object on a map detected by a vehicle-mounted sensor based on map information in a map database;

recognize a vehicle position that is a position of a vehicle on the map;

acquire a relative-relationship-on-map that is a relative distance between the target object detected by the vehicle-mounted sensor and the vehicle based on the target object position and the vehicle position on the map, the target object position being acquired from position information on the map associated with the target object detected by the vehicle-mounted sensor;

acquire a detected-relative-relationship that is a relative distance between the target object detected by the vehicle-mounted sensor and the vehicle, the relative distance being acquired from the result of detection performed by the vehicle-mounted sensor and a sensor parameter of the vehicle-mounted sensor including an attachment position of the vehicle mounted sensor;

acquire a map accuracy evaluation value that is calculated based on a difference between the relative distance of the relative-relationship-on-map and the relative distance of the detected-relative-relationship;

compare the map accuracy evaluation value to an evaluation threshold; and permit an autonomous driving control using the map information based on a result of evaluation of the map accuracy, wherein the controller is further configured to, based on the target object being road signs, set a longitudinal evaluation weight to be larger than a lateral evaluation weight and a height evaluation weight.

* * * * *